Figures 1, 2:
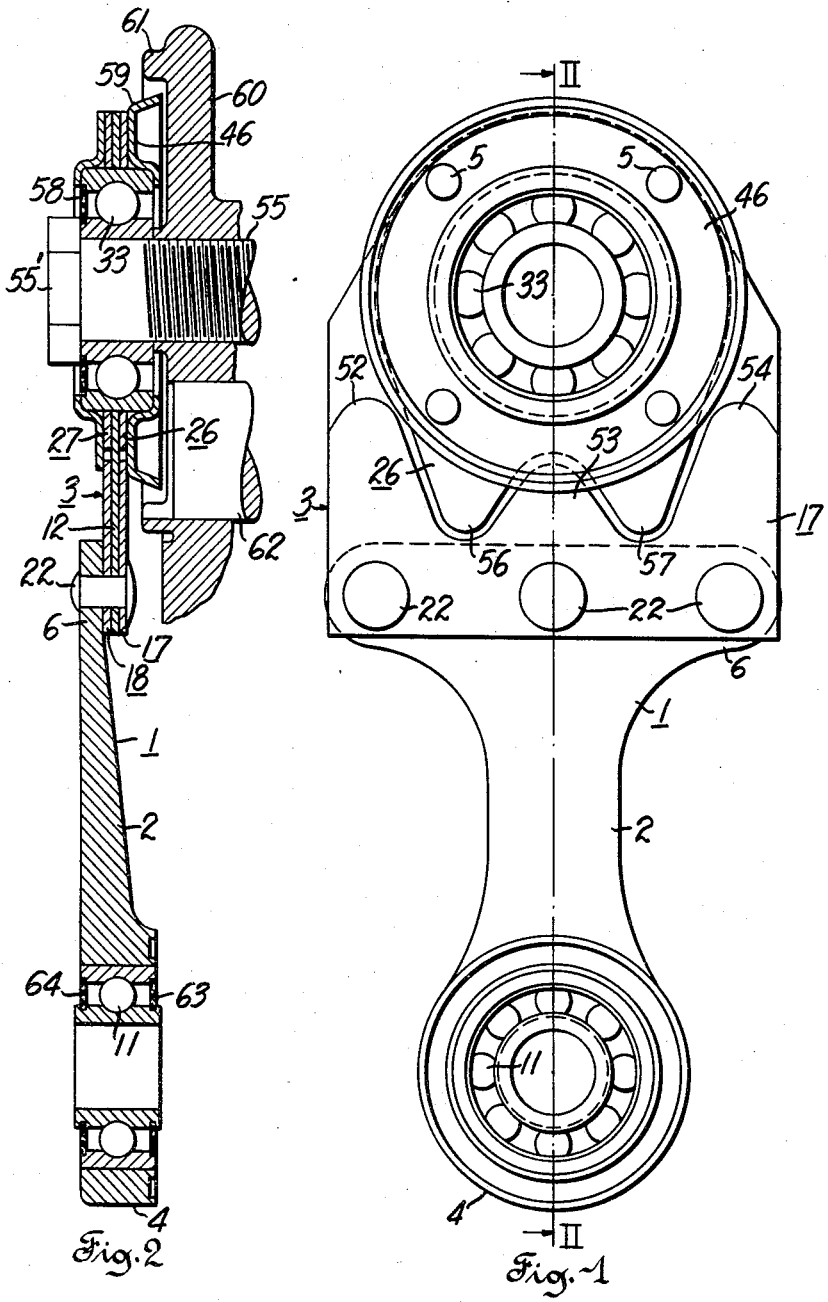

June 21, 1960 R. C. FERGASON 2,941,419
PITMAN

Filed March 12, 1956 2 Sheets-Sheet 1

Inventor
Rector L. Fergason
By Donald C. McGaughey
Attorney

United States Patent Office 2,941,419
Patented June 21, 1960

2,941,419
PITMAN

Rector C. Fergason, Gadsden, Ala., assignor to Allis-Chalmers Manufacturing Company, Milwaukee, Wis.

Filed Mar. 12, 1956, Ser. No. 571,091

4 Claims. (Cl. 74—581)

The present invention relates generally to power transmitting mechanisms, and it is concerned more particularly with a pitman for transmitting power from a rotary driving element to a reciprocating driven element.

In cutting mechanisms for mowers, combines, harvesters and other agricultural implements wherein back and forth movement of a reciprocable cutting element is derived from a continuously rotating crank, pitmans of a special type have heretofore been used incorporating a flexible connection, usually consisting of a single piece of spring steel, between the body of the pitman and the bearing which is mounted on the crank pin. A pitman of this type will accommodate minor manufacturing tolerances, as for example, the frequent condition in which the crank pin is slightly out of perpendicular to the plane in which the pitman operates. In such instances the axis of the crank pin will not generate a true cylinder and the result is a lateral displacement which must be absorbed by the flexible connection.

In sickle bar mowers and other drives which are normally operated at speeds of less than two thousand strokes per minute, a pitman having a flexible connection of the mentioned type may be used without undue difficulties. However, when used in high speed mowers operating between two and three thousand strokes per minute where a much higher frequency of lateral flexing occurs, these flexible connections present a continuous problem due to failure and breakage of the flexible connection.

Generally, it is an object of this invention to provide an improved pitman having a flexible connection between the pitman body and the bearing, and which will take care of the hereinabove outlined requirements in a fully satisfactory manner.

More specifically, it is an object of the invention to provide a pitman of the hereinabove outlined character, incorporating a flexible thrust load transmitting element and stress distributing connections between the latter and associated parts of the pitman which will protect the flexible element against premature failure due to excessive stress concentrations.

Another object of the invention is to provide a flexible type pitman of the hereinabove outlined character including an improved retainer structure for a bearing, preferably of the antifriction type, on a laminated arm section of the pitman.

A further object of this invention to provide an improved pitman of the hereinabove outlined character which is simple and compact in construction, efficient in operation and which may be economically manufactured.

The foregoing and other objects and advantages are attained by the present invention, various novel features of which will be apparent from the description herein and the accompanying drawings disclosing an embodiment of the invention, and will be more particularly pointed out in the appended claims.

Referring to the drawings:
Fig. 1 is a plan view of a pitman arm;
Fig. 2 is a sectional view taken along line II—II of Fig. 1; and
Fig. 3 is an enlarged perspective exploded view of the pitman arm shown in Fig. 1.

Referring to Figs. 1 and 2, the pitman 1 consists generally of a stiff arm section 2 and a laminated laterally flexible arm section 3. Referring first to the stiff arm section 2 which extends to the right in Fig. 3. The section 2 includes an integrally formed bearing housing 4 at one end thereof and a fan shaped mounting flange 6 at the other end thereof. The flange 6 is provided with a spaced series of three rivet receiving apertures 7, 8 and 9, adapted to receive rivets 22 for mounting the laminated arm section 3 thereon. The arm section 2 is completed by antifriction bearing 11 which is rigidly mounted in housing 4.

The laminated flexible arm section 3 includes a main leaf 12 (Fig. 3) adapted to be rigidly secured at one end in longitudinal thrust load transmitting relation with said stiff arm section 2. The master leaf 12 is formed out of a suitable material such as spring steel, and has a series of apertures 13 therethrough registerable with the apertures 7, 8 and 9 in flange 6. The other end of element 12 presents an apertured portion 15 in surrounding relation to an associated bearing 33. A peripheral flange 20 defines the bearing receiving aperture 14 and presents circumferentially spaced rivet receiving apertures as at 16.

Figure 3:
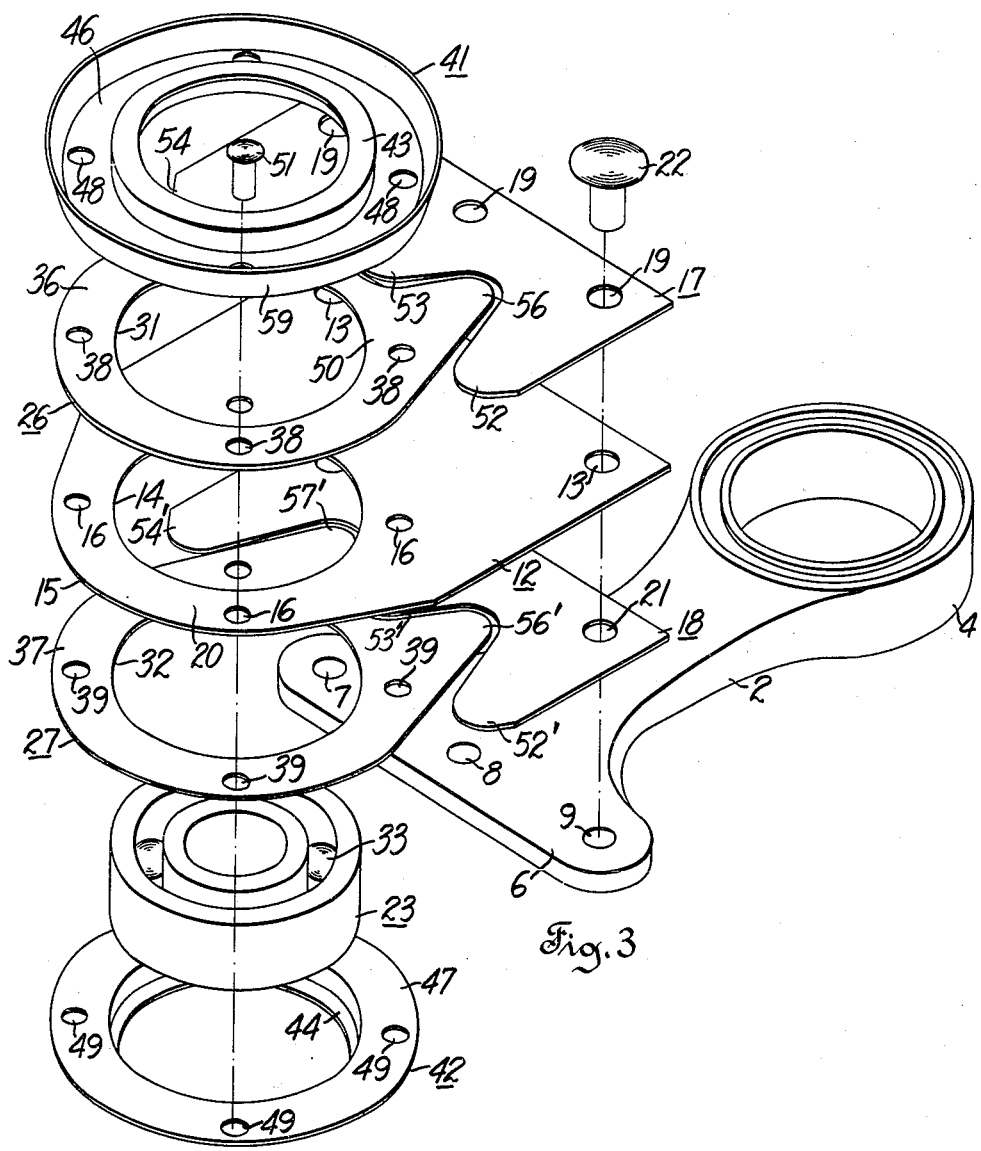

As best shown at Fig. 3, the end of master element 12 having the rivet receiving apertures 13, that is, the end extending to the right in Fig. 3, is provided at opposite sides thereof with a stress distributing structure consisting of a first pair of side leaves 17 and 18. The leaves 17 and 18 are formed out of a suitable material such as spring steel, and each is provided with a spaced series of three rivet receiving apertures as at 19 and 21 (Fig. 3). In assembly leaves 17 and 18 are sandwiched on opposite sides of main leaf 12 with their rivet receiving apertures 19 and 21 in registry with the rivet apertures 13 in main leaf 12. This subassembly consisting of main leaf 12 and side leaves 17 and 18 is then rigidly secured to the mounting flange 6 by rivets 22, only one of which appears in Fig. 3. When thus installed the first side leaves 17 and 18 are rigidly secured to stiff arm section 2 to project therefrom in bending load transmitting relation to opposite sides of the main leaf 12.

The laminated flexible arm section 3 is completed by adding the laminated subassembly 23. The subassembly 23 includes a laterally flexible reinforcing element consisting of a second pair of spring steel side leaves 26 and 27 each presenting flanged or apertured portions 36 and 37 in surrounding relation to an associated bearing 33. Peripheral flanges 36 and 37, respectively, define bearing receiving apertures 31 and 32, and present circumferentially spaced rivet receiving apertures as at 38 and 39, respectively. The subassembly 23 further includes upper and lower bearing retainer or cap members 41 and 42. The upper retainer member 41 has a circular concave or dished out portion 43 formed therein as by stamping, which is adapted to receive the upper portion of bearing 33. The lower retainer 42 is provided with a complementary concave or dished portion 44 adapted to receive the lower portion of bearing 33. Circumferential flanges 46 and 47, which surround the upper and lower dished portions 43 and 44, respectively, are each provided with a series of circumferentially spaced rivet receiving apertures therethrough, as at 48 and 49, respectively.

In assembling upper and lower bearing retainers 41 and 42 are placed in face to face engagement, respectively, with the second pair of side leaves 26 and 27, with the main leaf 12 and the bearing 33 positioned therebetween. Apertures 48, 38, 16, 39, 49 are then aligned and rivets 51 (Fig. 3) are passed therethrough to rigidly secure the subassembly together on the main leaf 12. As thus installed the second side leaves 26 and 27 project from the bearing member 33 in bending load transmitting relation to opposite sides of the main element 12.

As best appears on Figs. 1 and 3, the first side leaf 17, which projects toward the second side leaf 26 on the same side of the main leaf 12, is provided with a spaced series of three longitudinally extending protuberances or scallops 52, 53 and 54 which define recesses therebetween. The second side leaf 26 has a scalloped skirt portion 50 projecting toward leaf 17 and defining a pair of longitudinal protuberances 56 and 57 which define a recess therebetween adapted to receive protuberance 53. In the installed condition, as shown in Fig. 1, the protuberances of the first and second side leaves 17 and 26 on the same side of the main leaf 12 are operatively positioned in interdigitated relation with each other. That is, the scallops or protuberances 56 and 57 on the second side leaf 26 interfit with the recesses of the first side leaf 17 defined by protuberances 52, 53 and 54 so as to distribute flexing stress over said main leaf 12.

The first side leaf 18 (Fig. 3) which is positioned in bending load transmitting relation to the other or under side of the main element 12, as viewed in Fig. 3, has protuberances 52', 53' and 54' identical in construction with the protuberances on element 17. The protuberances 52', 53' and 54' are operatively positioned in interdigitated relation with protuberances 56' and 57' on auxiliary element 27 in a manner identical to that of auxiliary elements 17 and 26 and further description of these elements is believed unnecessary.

In the assembled condition the antifriction bearing 33 is operatively associated with a conventional crank pin 55 which is threaded into a driving flywheel 60. The enlarged head portion 55' of crank pin 55 bears against the inner race of bearing 33 to prevent axial displacement of the pitman 1 from the pin 55. The flywheel 60 may be driven by a suitable power source such as the power take-off shaft 62 of a conventional tractor. A suitable grease seal 58 (Fig. 2) is associated with bearing 33 to prevent the entrance of dirt, dust and the like into the bearing. Additional protection for bearing 33 is provided by the flared annular skirt or grass deflecting portion 59 (Figs. 2 and 3) which is formed integral with flange 46, and which is in laterally projecting relation to said flexible arm section 3. The skirt 59 interfits with a grass deflecting bead 61, as shown in Fig. 2. Upon operation of the pitman at high speed the skirt 59 and bead 61 interact to deflect grass and the like, which might tend to wind about the crank pin 55 and damage bearing 33.

The bearing 11 mounted in the stiff arm section 2 is also provided with conventional grease seals 63 and 64 to prevent the entrance of dirt and the like. It will be understood that the seal 63 is removed in Fig. 1 for the purpose of disclosing bearing 11.

Under high speed operation these stress distributing connections will accommodate a limited extent of lateral flexing at high speed. This flexibility will accommodate minor manufacturing tolerances and certain overload conditions where, as for example, the operating parts of a mower may be momentarily stressed out of operating alignment due to impact loads and the like. When the pitman 1 and main leaf 12 flex laterally, as for example, to the left in Fig. 2, the first and second lower side leaves 18 and 27 bend or flex to the left; the interfitting protuberances of these two side leaves also flex so as to avoid an undue concentration of lateral bending stresses in main leaf 12. When this condition occurs the first and second upper side leaves 17 and 26 are inopeartive, that is, they do not flex. However, when the pitman 1 and leaf 12 flex to the right, as viewed in Fig. 2, the elements 17 and 26 are placed in bending load transmitting relation with the main element 12, and the elements 18 and 27 assume a normal unstressed position. Thus the flexible arm section may be deflected laterally in either direction without creating a concentrated line of lateral bending stress on the main element 12.

In general terms, the stiff arm section 2 and the laminated arm section 3 are connected in end to end relation with each other and present first and second bearing members at their distal ends, respectively, such bearing members being represented in the illustrated embodiment of the invention by the antifriction bearings 11 and 33, respectively. A first pair of side leaves straddling one end of the main leaf 12 in lengthwise extending relation thereto are represented by the side leaves 17 and 18, and a second pair of side leaves straddling the other end of the main leaf 12 are represented by the side leaves 26 and 27. Said one end of the main leaf and the first pair of side leaves are secured to the stiff arm section 2 by first fastening means as represented by the rivets 22 so as to present free end portions of said first side leaves in laterally yieldable relation to said first fastening means, stiff arm section and second bearing member. The other end of the main leaf 12 and the second pair of side leaves are secured to the second bearing member 33 by second fastening means, as represented by the head 55' and cooperating parts, so as to present free end portions of the second side leaves in laterally yieldable relation to the second fastening means, bearing member 33 and stiff arm section 2.

It should be understood that it is not intended to limit the invention to the herein disclosed forms and details of construction, and that the invention includes such other forms and modifications as are embraced by the scope of the appended claims.

It is claimed and desired to secure by Letters Patent:

1. A pitman comprising a stiff arm section and a laterally flexible arm section connected in end to end relation with each other and presenting first and second bearing members at their distal ends, respectively; said flexible arm section comprising a main leaf, a first pair of side leaves straddling one end of said main leaf in lengthwise extending relation thereto, a second pair of side leaves straddling the other end of said main leaf in lengthwise extending relation thereto and in longitudinally spaced relation to said first side leaves; first fastening means securing said main leaf at said one end thereof and said first pair of side leaves to said stiff arm section so as to present free end portions of said first side leaves in laterally yieldable relation to said main leaf; and second fastening means securing said main leaf at said other end thereof and said second pair of side leaves to said second bearing member so as to present free end portions of said second side leaves in laterally yieldable relation to said main leaf.

2. A pitman as set forth in claim 1, wherein said free ends of said first and second pairs of side leaves are provided with lengthwise extending protuberances, respectively, in interdigitated relation to each other.

3. A pitman as set forth in claim 1, wherein said second pair of side leaves each present an apertured portion in surrounding relation to said second bearing member, and further comprising a pair of annular bearing retainers in face to face engagement, respectively, with said second pair of side leaves and in cooperative retaining engagement with said second bearing member.

4. A pitman as set forth in claim 3, wherein one of said bearing retainers has an annular skirt portion in laterally projecting relation to said flexible arm section.

(References on following page)

References Cited in the file of this patent

UNITED STATES PATENTS

| | | |
|---|---|---|
| 806,236 | Brown | Dec. 5, 1905 |
| 1,461,497 | Robbins | July 10, 1923 |
| 1,770,624 | Noble | July 15, 1930 |
| 1,956,922 | Ingram | May 1, 1934 |
| 2,726,555 | McGrath | Dec. 13, 1955 |

FOREIGN PATENTS

| | | |
|---|---|---|
| 170,526 | Germany | May 16, 1905 |
| 530,942 | Great Britain | Dec. 24, 1940 |
| 417,448 | Italy | Jan. 20, 1947 |
| 421,233 | Italy | May 20, 1947 |